Patented Feb. 24, 1948

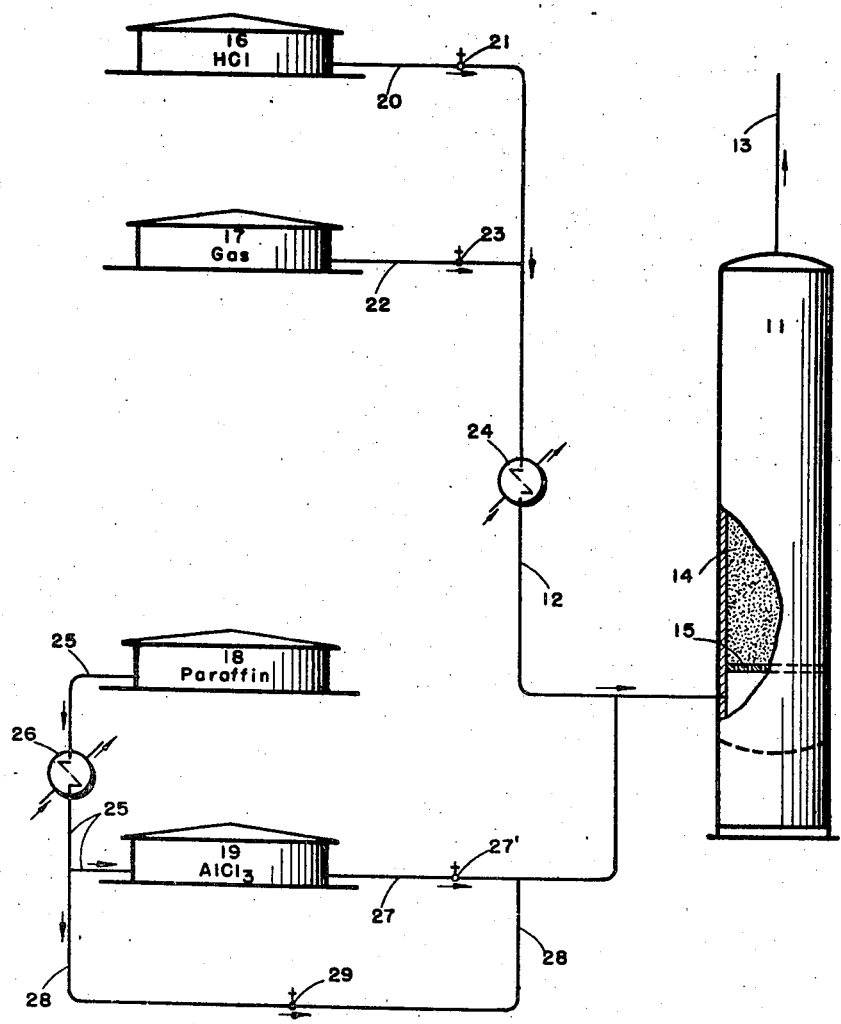

2,436,564

UNITED STATES PATENT OFFICE 2,436,564

PRETREATMENT OF REACTION ZONE CONTAINING IRON OXIDE

Otto Gerbes, Goose Creek, Tex., assignor to Standard Oil Development Company, a corporation of Delaware Application May 8, 1944, Serial No. 534,671

9 Claims. (Cl. 260—683.5)

The present invention is directed to the treatment of apparatus suitable for confining anhydrous admixtures of hydrocarbons and hydrogen halides, hydrocarbons and metal halides, and hydrocarbons, hydrogen halides and metal halides.

In its more specific aspects, the invention is directed to the pretreatment of reaction vessels having present therein iron oxides. Such oxides may form a coating of the interior wall of the vessel or may be present in a catalyst or catalyst support within the vessel, or present both as a coating on the wall of the vessel and within the catalyst support. The pretreatment involves the steps of converting the iron oxide into another iron compound and water, and the subsequent removal of the resulting water to provide an improved reaction vessel in which to conduct reactions involving anhydrous admixtures of hydrocarbons and hydrogen halides or metal halides or hydrogen halides and metal halides such as are used in isomerization reactions.

Reactions involving mixtures of hydrocarbons, hydrogen halides and metal halides are well known to the art. A typical example is the isomerization of a paraffinic hydrocarbon in the presence of a metal halide, such as aluminum chloride. If it is desirable to conduct this reaction in the vapor phase, the metal halide is usually deposited upon a suitable carrier and the paraffinic hydrocarbon in the vapor phase is caused to pass over the metal halide catalyst. It is usually advantageous to have a small amount of a hydrogen halide in the hydrocarbon vapors being passed over the metal halide, the hydrocarbon halide serving as a promoter for the reaction. Such reaction mixtures may also be employed in liquid phase operation. For example, a paraffinic hydrocarbon may be isomerized in the liquid phase in the presence of a hydrogen halide and a metal halide.

I have now discovered that reactions involving anhydrous admixtures of a hydrogen halide and an organic substance should be conducted in a reaction zone free from iron oxides. If a solid support for catalytic material is present in the reaction zone, the support should be treated to convert iron oxide present therein to another compound and the oxygen removed from the iron oxide should be purged from the reaction zone prior to the admission of the reactants to the zone. If the reaction zone is defined by a vessel having an interior surface comprised essentially of iron, it is desirable to treat the interior wall to free it from iron oxide before conducting the reaction. When a catalyst support is employed iron oxide usually is present in the catalyst support and as a coating on the interior wall of the vessel, and it is desirable to remove the iron oxide both from the catalyst and from the wall of the vessel before introducing the anhydrous reactants therein.

I have found that the iron oxide within a selected reaction zone may be readily removed by bringing the zone into contact with an anhydrous hydrogen halide under conditions to cause the hydrogen halide to react with the iron oxide to form iron halide and water, and subsequently stripping the resulting water from the zone. The stripping step may be performed by a suitable non-oxygen-containing gas, such as nitrogen or flue gas, or by a hydrocarbon, such as methane, ethane or a higher molecular weight hydrocarbon.

It is conventional to isomerize a paraffinic hydrocarbon in the vapor phase in the presence of a metal halide catalyst deposited on a support. The support commonly used is bauxite or a similar mineral which contains appreciable amounts of iron oxide. When carrying out this reaction a paraffinic hydrocarbon in the vapor phase is mixed with a small amount of anhydrous hydrogen chloride to act as a promoter for the reaction, and the admixture is caused to flow over the catalyst under such conditions as to cause substantial isomerization of the paraffin. The iron oxide present in the reaction zone may cause the following chemical reactions to take place:

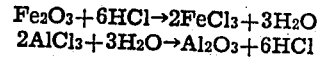

$$Fe_2O_3 + 6HCl \rightarrow 2FeCl_3 + 3H_2O$$
$$2AlCl_3 + 3H_2O \rightarrow Al_2O_3 + 6HCl$$

It will be seen that the iron oxide may react with the hydrogen chloride to form ferric chloride and water and the water in turn may unite with the aluminum chloride to form aluminum oxide and hydrogen chloride. The aluminum oxide resulting from this reaction is catalytically non-active as far as the isomerization process is concerned. This catalytically non-active material remains on the catalyst support and may reduce its adsorptive capacity. This loss may be appreciable, as shown by the following calculations. In the reactor bed 50,000 pounds of bauxite were employed as the catalyst support. The bauxite had an iron oxide content of 2% by weight. The initial adsorptive capacity of the bauxite for aluminum chloride was approximately 20% by weight, or 10,000 pounds of aluminum chloride. If during the course of the isomerization reaction, all of the iron oxide present in the reactor bed were converted to ferric chloride and water, the resulting water would be capable of reacting with 1630 pounds of aluminum chloride and would cause a loss of over 16% of the adsorptive capacity of the bed. Even though some of the water is carried off with the reactants before it has an opportunity to unite with the aluminum chloride catalyst, it still is detrimental to the system because it absorbs hydrogen chloride to form hydrochloric acid and corrodes the equipment used for recovering the products from the isomerization zone.

One method of treating the reaction zone having iron oxide present therein is by first treating the reaction zone with a hydrogen halide under conditions to cause the hydrogen halide to form iron halide and water, and subsequently displacing the resulting water by flowing an inert gaseous agent through the reaction zone. As an alternative procedure, the hydrogen halide and the gaseous or vaporous stripping agent may be allowed to flow simultaneously through the reaction zone while maintaining conditions suitable to cause the reaction of the hydrogen halide with the iron oxide to form iron halide and water and to cause the inert gaseous agent to strip the water from the zone as it is formed. This latter alternative procedure is especially applicable to conversion operations such as vapor phase isomerization of paraffins employing a metal halide as a catalyst and an anhydrous hydrogen halide as a promoter for the reaction.

Preferred modifications of the present invention will now be described with reference to the drawing, in which the sole figure is in the form of a diagrammatic flow sheet.

Referring now specifically to the drawing, a reaction vessel 11 is provided with an inlet line 12 and outlet line 13. Within the vessel is a suitable catalytic support, such as bauxite, 14, which is maintained in position in the tower by a perforated plate 15. The vessel 11 is constructed in the conventional manner with the inner wall comprising a major portion of iron which is converted to ferric oxide upon exposure to oxygen or oxygen-containing materials. The catalyst support 14 comprises appreciable amounts of ferric oxide.

Anhydrous hydrogen halide, such as hydrogen chloride, is stored in a vessel 16, which is connected to vessel 11 by branch line 20 controlled by valve 21 and line 12 containing heater 24. A non-oxygen-containing gas, such as methane, is stored in vessel 17, which is connected to line 12 by branch line 22 containing valve 23. A paraffinic hydrocarbon suitable for isomerization, such as butane, is stored within vessel 18, and a metallic halide, such as aluminum chloride, is within vessel 19. Vessel 18 is fluidly connected to vessel 19 by line 25 containing heater 26. A line 27 connects vessel 19 to inlet line 12. A by-pass line 28 is arranged for by-passing vessel 19 with a valve 29 arranged in the by-pass line and a valve 27' arranged in line 27 to allow the paraffinic material from vessel 18 to be passed through or around vessel 19 at the option of the operator.

As one embodiment of the present invention, valve 21 is opened and anhydrous hydrogen chloride is allowed to pass through heater 24, where it is heated to a temperature in the range of 200° to 340° F. and then into vessel 11 and upwardly through catalytic support 14. The hot hydrogen chloride coming into contact with the iron oxide in the catalyst support and coating the walls of the reaction vessel reacts with it to form iron chloride and water. In order to insure an opportunity for all of the iron oxide within vessel 11 to be converted to iron chloride, the amount of hydrogen chloride allowed to pass through the vessel should be at least stoichiometrically equal the ferric oxide content of the bauxite, and usually greater amounts will be used. After the desired amount of hydrogen chloride has been passed into vessel 11, valve 21 may be closed and valve 23 opened and stripping gas from vessel 17 allowed to pass over heater 24, where it is preferably heated to at least 250° F., although the temperature range may be as low as 200° and as high as 340° F., and the heated gas is then passed through vessel 11 in order to strip water therefrom. The hot gas is allowed to pass through vessel 11 until the water is substantially completely removed as indicated by the absence of water vapors in the fluid removed via line 13. The vessel is now free from iron oxide and the catalyst support may be prepared for the isomerization reaction by passing paraffinic feed stock from vessel 18 through heater 26, where it is heated in the range of 200° to 340° F., and thence through vessel 19 to vaporize aluminum chloride present therein, and the admixture of hydrocarbon and aluminum chloride vapors then passed through vessel 11 to allow the alumnium chloride to become adsorbed on the catalyst support 14. After the aluminum chloride is deposited on the catalyst support, valve 27' may be closed and valve 29 opened to by-pass the feed hydrocarbon around vessel 19 so that the flow of the hydrocarbon will be through the heater and directly into the reaction chamber. Some isomerization will take place during the time the aluminum chloride is being deposited on the catalytic mass, and after the deposition of the aluminum chloride is complete this reaction may of course be continued with continued flow of the feed. A small amount of hydrogen chloride may of course be added to act as an isomerization promoter by valve 21.

In another procedure, the reaction vessel 11 may be freed of iron oxide by passing, simultaneously, heated anhydrous hydrogen chloride and the vaporized feed hydrocarbon through the vessel 11. In this particular embodiment, this is accomplished by opening valve 21 in line 20 and thereby connecting vessel 16 containing hydrogen chloride with line 12. At the same time valve 29 in line 28 is opened allowing passage of normal butane from vessel 18 to line 12. The hydrogen chloride passes through heater 24 and the normal butane passes through heater 26. The heat added to these components is controlled so that when they are admixed in line 12 the temperature of the mixture is in the range of 200° to 350° F., causing the butane to be vaporized; the mixture is then passed through reaction vessel 11, containing the porous bed of adsorbent material 14. As the heated mixture of vaporized normal butane and hydrogen chloride passes through the vessel 11, the anhydrous hydrogen chloride reacts with the iron oxide present on the interior surfaces of the vessel 11 and the iron oxide contained in the porous bed of adsorbent material 14. As a result of the reaction, water is released which is swept out of the vessel 11 by the hot vaporized normal butane present in the admixture. The water leaves the vessel 11 through line 13.

After a suitable period of treatment, testing of the effluent leaving vessel 11 by line 13 will reveal the absence of water and the treatment in this manner may then be terminated. Valve 21 in line 20 is then shut off and valve 27' is opened up while valve 29 is closed off, allowing the butane to pass through heater 26 and thence to vessel 19, where aluminum chloride is sublimed and picked up by the vaporized hydrocarbon and the mixture thence passes through line 12 and heater 24 to reaction vessel 11 whereby aluminum chloride is deposited on the porous support, which has been freed of iron oxide in the manner described. After the desired quantity of aluminum chloride has been sublimed onto the porous bed 14, vessel 19 may be by-passed and the vaporized normal butane passed to the reaction vessel 11 to be isomerized.

As an alternative procedure, the iron oxide originally present within the reactor may be eliminated as follows. With the catalyst support in vessel 11 containing an appreciable amount of iron oxide and the walls of the vessel also coated with iron oxide, and valves 21, 23 and 29 closed, feed hydrocarbon from vessel 18 may be allowed to pass through heater 26, where it is heated to a temperature in the range of 200° to 350° F. and the heated feed stock then passed through vessel 19, where it causes the aluminum chloride to sublime and the mixture of aluminum chloride and hydrocarbon vapor is then allowed to pass through reaction vessel 11. The amount of aluminum chloride and hydrocarbon vapors initially introduced within the vessel is strictly limited so that only the catalyst support at the inlet end is supplied with aluminum chloride catalyst. In other words, it is desirable that the adsorptive capacity of the catalyst support have deposited thereon no more than 25% of the aluminum chloride it is capable of adsorbing. After this portion of aluminum chloride has been preliminarily deposited on the catalytic support, valve 27' is closed and valves 29 and 21 opened to allow a mixture of hot hydrocarbon vapors and hot hydrogen chloride vapors to flow through reaction vessel 11. As the mixture of hydrocarbon vapor and hydrogen chloride pass through the vessel the hydrogen chloride reacts with the iron oxide present to form ferric chloride and water and the hydrocarbon vapors strip the water from the reaction zone. The hydrocarbon vapors which serve to strip the water vapors from the reaction zone undergo considerable isomerization upon coming in contact with the aluminum chloride initially deposited on a minor portion of the catalyst support, and the admixture may be withdrawn through outlet 13 to a suitable recovery system, not shown. The admixture of hot hydrogen chloride vapors is passed through the zone until at least a stoichiometrical amount of hydrogen chloride has been passed through the reactor to unite with the ferric oxide originally present therein. After the desired amount of hydrogen chloride and hydrocarbon vapors have been passed through the reactor to unite with the ferric oxide and to strip the resulting water, the remainder of the adsorptive ability of the catalyst support may be employed. This may be done by closing valves 21 and 29 and opening valve 27' to allow hydrocarbon vapors heated by means 26 to pass through aluminum-chloride-containing vessel 19 to sublime the aluminum chloride, and the admixture of aluminum chloride vapors and hydrocarbon vapors then passed through vessel 11. After the catalytic mass has adsorbed the full amount of aluminum chloride possible, the direction of flow is altered by closing valve 27' and opening valve 29 to allow the hot hydrocarbon vapors to by-pass vessel 19, and the flow of the hydrocarbon vapors is continued through chamber 19 with isomerization of the vapors. It is to be understood that when flowing paraffinic hydrocarbon vapors through the vessel, a small amount of hydrogen chloride may be added thereto as an isomerization promoter by means of valve 22.

It will be obvious that a number of advantages are inherent in the practice of the present invention. The loss of substantial amounts of metallic halide is prevented by the pretreatment of the reaction zone. As another outstanding advantage, the catalyst obtained is very reactive and the adsorptive capacity of the catalytic support is utilized to the furthest extent.

Having fully described and illustrated preferred embodiments of the present invention, what I desire to claim is:

1. A method for the pretreatment of a reaction zone adapted to the subsequent catalytic conversion of hydrocarbons in the presence of anhydrous hydrogen halide and aluminum chloride supported upon a porous solid, said reaction zone initially including iron oxide in small amounts and porous solid substantially free of aluminum chloride, comprising the steps of introducing anhydrous hydrogen halide into the reaction zone and there reacting it with the iron oxide in the absence of aluminum chloride to form iron halide and water, passing a gasiform material through the reaction zone to remove said water therefrom and subsequently introducing anhydrous aluminum chloride and anhydrous hydrocarbon feed stock into said reaction zone and catalytically converting at least a portion of the feed stock therein.

2. A method for the pretreatment of a reaction zone in which a porous bed substantially free of aluminum chloride and comprising iron oxide is present and said zone is subsequently adapted to the catalytic conversion of hydrocarbons in the presence of anhydrous hydrogen halide and aluminum chloride supported upon said bed, comprising the steps of introducing anhydrous hydrogen halide into the reaction zone and reacting it with the iron oxide in the absence of aluminum chloride therein to form iron halide and water, passing a gasiform material through the reaction zone to remove said water therefrom, subsequently introducing anhydrous aluminum chloride into said reaction zone and depositing at least a portion on the porous bed to form an active catalytic mass and contacting hydrocarbon feed stock with said active catalytic mass under conditions to convert catalytically at least a portion of said feed stock.

3. A method for the pretreatment of a reaction zone in which a porous bed substantially free of aluminum chloride and comprising ferric oxide is present and said zone is subsequently adapted to the catalytic conversion of hydrocarbons in the presence of anhydrous hydrogen chloride and aluminum chloride supported upon said bed comprising the steps of maintaining the reaction zone at a temperature within the range of 200° to 340° F., introducing anhydrous hydrogen chloride and hydrocarbon into said reaction zone while maintaining it within said temperature range to cause the hydrogen chloride to react with the ferric oxide in the absence of aluminum chloride to form ferric chloride and water, withdrawing a mixture of water vapors and hydrocarbon from said reaction zone, subsequently introducing anhydrous aluminum chloride into said reaction zone and depositing at least a portion on the porous bed to form an active catalytic mass and contacting anhydrous hydrocarbon feed stock and anhydrous hydrogen chloride with said active catalytic mass under conditions to convert catalytically at least a portion of said feed stock.

4. A method in accordance with claim 1 in which anhydrous hydrogen chloride is passed through the reaction zone to react with the iron oxide, the passage of the hydrogen chloride is terminated and an anhydrous gasiform material subsequently forced through the reaction zone to remove water therefrom.

5. A method in accordance with claim 1 in which aluminum chloride is preliminarily deposited within a portion of the reaction zone in an amount up to about 25% of the total aluminum chloride adsorbable by the porous solid within said portion of the reaction zone and in which a mixture of hydrogen halide and hydrocarbon vapors are subsequently passed through the reaction zone under conditions to cause the hydrogen halide to react with the iron oxide to form iron halide and in which the hydrocarbon vapor serves as a stripping agent to remove the water from the reaction zone.

6. A method in accordance with claim 2 in which an anhydrous hydrogen halide in vaporous condition is passed through the reaction zone to react with the ferric oxide in the bed to form ferric halide and water and in which the resulting water is subsequently stripped from the reaction zone by passing an anhydrous gas therethrough.

7. A method in accordance with claim 2 in which aluminum chloride is preliminarily deposited on the bed in an amount up to about 25% of the total aluminum chloride adsorbable by the bed by passing through the bed a composition including aluminum chloride and hydrocarbon both in vaporous condition, terminating flow of the composition, subsequently passing through the reaction zone a mixture of hydrogen halide and hydrocarbon in vaporous condition while maintaining such physical conditions within the reaction zone as to cause the hydrogen halide to react with the ferric oxide to form ferric halide and water and simultaneously with the formation of these reaction products stripping the water from the reaction zone by the hydrocarbon vapors.

8. A process in accordance with claim 3 in which a composition including aluminum chloride and a paraffin hydrocarbon in vaporous condition is first passed into the reaction zone in such amounts as to allow the aluminum chloride to be deposited on only a portion of the bed in an amount up to about 25% of the total aluminum chloride adsorbable by that portion of the bed and in which the bed is subsequently treated with an admixture of anhydrous hydrogen chloride and a hydrocarbon in vaporous form to cause the ferric oxide in the bed to react with the hydrogen chloride to form ferric chloride and water and in which the hydrocarbon vapors serve as a stripping agent to remove water from the bed.

9. A method for the pretreatment of a reaction zone in which a porous bed substantially free of aluminum chloride and comprising ferric oxide is present and said zone is subsequently adapted to the catalytic conversion of hydrocarbons in the presence of anhydrous hydrogen chloride and aluminum chloride supported on said bed, comprising the steps of maintaining the reaction zone at a temperature within the range of 200° F. to 340° F., introducing anhydrous hydrogen chloride into said reaction zone while maintaining it within said temperature range to cause the hydrogen chloride to react with the ferric oxide in the absence of aluminum chloride to form ferric chloride and water, passing hydrocarbon vapors into the reaction zone while maintaining it within said temperature range, withdrawing a mixture of water vapors and hydrocarbon from said reaction zone, subsequently introducing anhydrous aluminum chloride into said reaction zone and depositing at least a portion on the porous bed to form an active catalytic mass and contacting anhydrous hydrocarbon feed stock and anhydrous hydrogen chloride with said active catalytic mass under conditions to convert catalytically at least a portion of said feed stock.

OTTO GERBES.

REFERENCES CITED

The following references are of record in the file of this patent:

UNITED STATES PATENTS

| Number | Name | Date |
|---|---|---|
| 1,570,353 | Jacobson | Jan. 19, 1926 |
| 2,141,444 | Nordberg | Dec. 27, 1938 |
| 2,266,012 | D'Ouville et al. | Dec. 16, 1941 |
| 2,277,512 | De Simo et al. | Mar. 24, 1942 |
| 2,281,924 | De Simo et al. | May 5, 1942 |
| 2,309,263 | Thomas | Jan. 26, 1943 |
| 2,323,830 | McMillan | July 6, 1943 |
| 2,344,466 | Laughlin | Mar. 14, 1944 |
| 2,354,851 | Danforth | Aug. 1, 1944 |
| 2,407,231 | Galstaun | Sept. 19, 1946 |